Patented Oct. 31, 1933

1,932,624

UNITED STATES PATENT OFFICE 1,932,624

MANUFACTURE OF ADHESIVES

Albert W. Holmberg, Bloomfield, N. J., assignor to The Naugatuck Chemical Company, Naugatuck, Conn., a corporation of Connecticut No Drawing. Application October 2, 1928
Serial No. 309,899

16 Claims. (Cl. 87—17)

This invention relates to the making of latex adhesives and particularly to the making of an adhesive from creamed latex.

It has been the practice heretofore to use rubber cements or normal or concentrated latex in the manufacture of adhesives. An object of this invention is to provide an improved adhesive from creamed latex which displays superior stripping qualities.

Another object is to provide an improved latex adhesive which will retain its good condition for a considerable time, be substantially free from undesirable ammonia odor, fire hazards, and one in which there is substantially no loss in solvent.

The invention consists broadly in creaming latex by any known method, adding thereto a softener if desired or volatile organic liquid in emulsion form or both. The latex may be acid, alkaline or neutral, and if desired curatives or fillers or both may be added thereto. Where there is an undesirable odor as of ammonia, a suitable aromatic substance can be used to mask the odor.

A preferred example of the invention is given as follows: To 100 parts of rubber as creamed latex add 20-40 parts of rosin oil as emulsion; 30-200 parts of carbon tetrachloride emulsion (carbon tetrachloride 60, water 38, glue 1, sodium oleate 1); 2-5 parts of oil of wintergreen. The use of the oil of wintergreen is optional. If a filler is desired, e. g. whiting, then 50-100 parts of this may be added to the above formula. Latex can be creamed with any available creaming agents such as pectin, Karaya gum, alginates, Irish moss, Iceland moss, and it may be creamed more than once if one creaming is unsatisfactory. Instead of rosin oil, one may use pine tar, white pine pitch or cumar, or any softener for rubber. In place of CCl₄, one may use either benzol, high flash coal tar, naphtha or solvent naphtha, in emulsion form. These water insoluble organic liquids, by reason of their volatility, assist in the removal of water during the drying of the adhesive. Water dispersions in general do not dry as rapidly as rubber cements made with volatile organic solvents, and by the above described addition, the adhesive of the present invention is caused to dry more rapidly. Instead of oil of wintergreen, one may use either terpineol, anisic aldehyde, phenyl ethyl alcohol, methyl salicylate, oil of lavender. Materials of the above described character, such as fillers, softeners, vulcanizing agents, accelerators, etc., which are added by the trade to rubber or latex, are in general known as compounding ingredients.

The new adhesive has wide application in the shoe, tire and rubber manufacture generally and when compared with ordinary latex adhesives has given superior stripping tests.

With the detailed disclosure given above, it is obvious that many modifications will suggest themselves and it is not desired to limit this invention otherwise than as set forth in the appended claims.

Having thus described my invention, what I claim and desire to protect by Letters Patent is:

1. The method of making an improved latex adhesive which comprises creaming latex, and adding thereto a softener.

2. The method of making an improved latex adhesive which comprises creaming latex, adding thereto a softener and a volatile water insoluble organic liquid in emulsion form, whereby during drying of the adhesive removal of water is aided.

3. The method of making an improved latex adhesive which comprises creaming latex, adding thereto compounding ingredients, a softener, and a volatile water insoluble organic liquid, whereby during drying of the adhesive removal of water is aided.

4. The method of making an improved latex adhesive which comprises creaming latex, adding thereto vulcanizing ingredients, a softener, and a volatile water insoluble organic liquid, whereby during drying of the adhesive removal of water is aided.

5. The method of making an improved latex adhesive which comprises creaming latex and adding thereto rosin oil.

6. The method of making an improved latex adhesive which comprises creaming latex, adding thereto rosin oil and a volatile water insoluble organic liquid in emulsion form, whereby during drying of the adhesive removal of water is aided.

7. The method of making an improved latex adhesive which comprises creaming latex, adding thereto a softener and carbon tetrachloride in emulsion form.

8. The method of making an improved latex adhesive which comprises creaming latex and adding thereto rosin oil and carbon tetrachloride in emulsion form.

9. The method of making an improved latex adhesive which comprises creaming latex, adding thereto rosin oil, carbon tetrachloride in emulsion form, and a deodorant adapted to substantially mask the odor of ammonia.

10. An adhesive comprising a mixture of creamed latex and a softener.

11. An adhesive comprising a mixture of creamed latex and rosin oil.

12. As a new adhesive, a compounded creamed latex including a softener and a volatile water insoluble organic capable of aiding in the removal of water during drying.

13. As a new adhesive a compounded creamed latex including rosin oil and a volatile water insoluble organic liquid capable of aiding in the removal of water during drying.

14. As a new adhesive a compounded creamed latex including vulcanizing ingredients, a softener and a volatile water insoluble organic liquid capable of aiding in the removal of water during drying.

15. An adhesive comprising a mixture of creamed latex, rosin oil, and oil of wintergreen.

16. An adhesive comprising a mixture of creamed latex, a softener, and carbon tetrachloride in emulsion form.

ALBERT W. HOLMBERG.